(12) United States Patent
Adhya et al.

(10) Patent No.: US 12,536,048 B2
(45) Date of Patent: Jan. 27, 2026

(54) ON-THE-FLY MIGRATION OF DISTRIBUTED OBJECT MANAGER (DOM) OWNER BETWEEN DOM SERVERS

(71) Applicant: VMware, Inc., Palo Alto, CA (US)

(72) Inventors: Saibal Kumar Adhya, Bangalore (IN); Eric Knauft, San Francisco, CA (US); Rahul Naren Pujari, Bangalore (IN); Sushanth Rai, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 579 days.

(21) Appl. No.: 17/991,122

(22) Filed: Nov. 21, 2022

(65) Prior Publication Data

US 2024/0168810 A1    May 23, 2024

(51) Int. Cl.
*G06F 9/46* (2006.01)
*G06F 9/50* (2006.01)

(52) U.S. Cl.
CPC .......... *G06F 9/5038* (2013.01); *G06F 9/5072* (2013.01); *G06F 2209/5011* (2013.01); *G06F 2209/505* (2013.01)

(58) Field of Classification Search
CPC .. G06F 9/5038; G06F 9/5072; G06F 9/45533; G06F 9/45558; G06F 9/4856; G06F 9/4862; G06F 9/4875; G06F 9/5083; G06F 9/5088; G06F 9/505; G06F 2209/5011; G06F 2209/505; G06F 2009/45562; G06F 2009/4557
See application file for complete search history.

(56) References Cited

U.S. PATENT DOCUMENTS

| | | | | |
|---|---|---|---|---|
| 2018/0146020 | A1* | 5/2018 | McClure | H04L 65/762 |
| 2019/0034505 | A1* | 1/2019 | Renauld | G06F 3/067 |
| 2019/0052708 | A1* | 2/2019 | Xiang | G06F 13/102 |
| 2020/0409570 | A1* | 12/2020 | Wolfson | G06F 3/0665 |
| 2023/0040891 | A1* | 2/2023 | Oh | H04N 19/15 |
| 2024/0272932 | A1* | 8/2024 | Lyu | G06F 9/45558 |

FOREIGN PATENT DOCUMENTS

WO    WO-2022074224 A1 *    4/2022    ............ B60R 16/03

* cited by examiner

*Primary Examiner* — April Y Blair
*Assistant Examiner* — Zhi Chen
(74) *Attorney, Agent, or Firm* — King Intellectual Asset Management

(57) ABSTRACT

A method for efficient distributed object manager (DOM) owner migration in a virtual storage area network (VSAN) is provided. Embodiments include determining to migrate a DOM owner object from a source DOM owner server to a destination DOM owner server. Embodiments include determining that an input or output (I/O) operation affecting the DOM owner object is in progress. Embodiments include, prior to updating the DOM owner object based on the I/O operation, transferring the DOM owner object from the source DOM owner server to the destination DOM owner server. Embodiments include completing execution of the I/O operation on the destination DOM owner server. Embodiments include updating the DOM owner object on the destination DOM owner server based on the I/O operation.

20 Claims, 6 Drawing Sheets

ON-THE-FLY MIGRATION OF DISTRIBUTED OBJECT MANAGER (DOM) OWNER BETWEEN DOM SERVERS

BACKGROUND

Distributed systems allow multiple clients in a network to access a pool of shared resources. For example, a distributed storage system allows a cluster of host computers to aggregate local disks (e.g., SSD, PCI-based flash storage, etc.) located in, or attached to, each host computer to create a single and shared pool of storage. This pool of storage (sometimes referred to herein as a "datastore" or "data storage") is accessible by all host computers in the cluster and may be presented as a single namespace of storage entities, such as a hierarchical file system namespace in the case of files, a flat namespace of unique identifiers in the case of objects, etc. Data storage clients in turn, such as virtual machines (VMs) spawned on the host computers, may use the datastore, for example, to store virtual disks that are accessed by the virtual machines during their operations.

In a distributed object-based datastore, such as a virtual storage area network (VSAN) datastore, access to individual objects is managed by distributed object managers (DOMs) running on the host computers. A DOM generally refers to a component that runs on a host computer and is responsible for handling object availability and input and/or output (I/O) requests with respect to objects. For instance, a DOM acts as either an "owner" or a "client" depending on the role it performs in a given transaction or its relationship to a particular object. A DOM acts as a client when it send an I/O request with respect to an object of which it is not an owner, such as sending the I/O request to the DOM on a different host computer that is the owner of the object. A DOM that acts as an owner for a given object may be referred to as a DOM owner object. For example, a given DOM owner object on a given host computer may be assigned to each object in order to manage access to the object. DOM owner objects generally run on DOM owner servers, which are software constructs that function as processor threads that allow processing resources of the host computer to be dedicated to particular DOM owner objects. In many cases, DOM owner objects are subjected to a heavy load of I/O operations, and these operations may be bursty (e.g., may occur in concentrated bursts). As a result, DOM owner servers may be unequally loaded, and highly-loaded DOM owner servers may cause I/O latency. As such, there is a need in the art for improved techniques of balancing load across a plurality of DOM owner servers.

It should be noted that the information included in the Background section herein is simply meant to provide a reference for the discussion of certain embodiments in the Detailed Description. None of the information included in this Background should be considered as an admission of prior art.

DETAILED DESCRIPTION

According to certain embodiments of the present disclosure, DOM owner objects are dynamically migrated between DOM owner servers in an efficient manner in order to distribute load and reduce latency at the DOM layer.

When migrating a DOM owner object it is important to minimize delays and processor utilization associated with the migration so that the migration itself does not contribute to decreased performance. As such, techniques described herein involve transferring ongoing I/O operations along with a DOM owner object from a source DOM owner server to a destination DOM owner server without waiting for the I/O operations to complete on the source DOM owner server. For example, an ongoing I/O operation may comprise a plurality of components corresponding to individual processor cycles that result in one or more incremental updates to a DOM owner object. According to certain embodiments, the DOM owner object is not actually updated based on an I/O operation until the plurality of components of the I/O operation have been completed. As such, if an I/O operation comprising a plurality of components is ongoing at the time of migration, the currently-executing component may be completed and then the DOM owner object may be migrated from the source DOM owner server to the destination DOM owner server prior to executing any subsequent components, completing the I/O operation, and updating the DOM owner object accordingly on the destination DOM owner server.

Furthermore, management of network connections associated with a DOM owner object, such as transport control protocol (TCP) connections, are abstracted away from the DOM owner server and managed instead at one or more separate components so that the DOM owner object can be migrated without re-establishing network connectivity or performing connectivity-related reconciliation operations at the destination DOM owner server.

Figure 1:
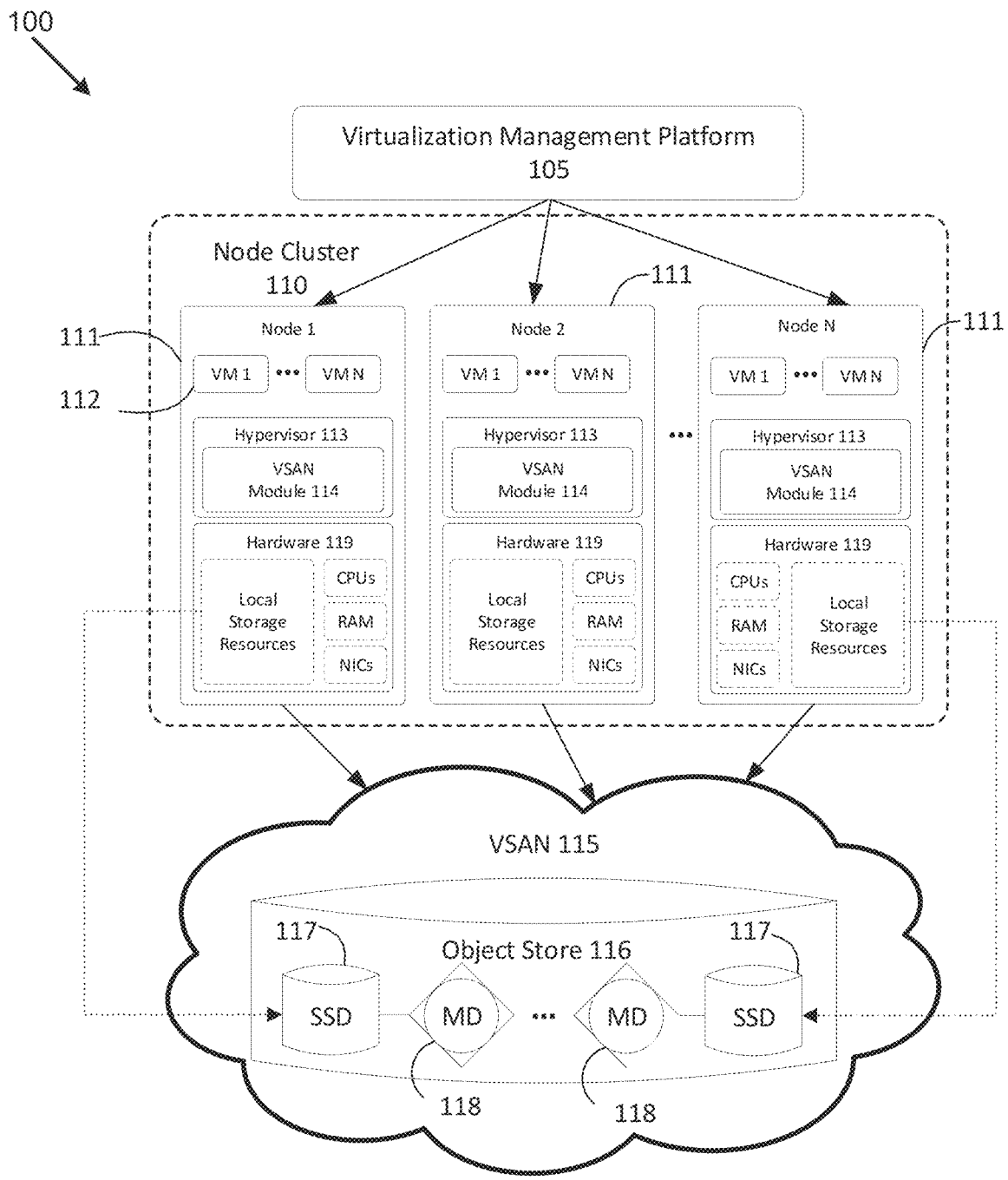
FIG. 1 is a diagram illustrating an example computing environment in which embodiments of the present application may be practiced.

FIG. 1 is a diagram illustrating an example computing environment 100 in which embodiments of the present application may be practiced. As shown, computing environment 100 may include a distributed object-based datastore, such as a software-based "virtual storage area network" (VSAN) environment that leverages the commodity local storage housed in or directly attached (hereinafter, use of the term "housed" or "housed in" may be used to encompass both housed in, or otherwise directly attached) to host machines/servers or nodes 111 of a cluster 110 to provide an aggregate object store 116 to virtual machines (VMs) 112 running on the nodes. The local commodity storage housed in the nodes 111 may include combinations of solid state drives (SSDs) or non-volatile memory express (NVMe) drives 117, magnetic or spinning disks or slower/cheaper SSDs 118, or other types of storages.

In certain embodiments, SSDs 117 may serve as a read cache and/or write buffer (e.g., in the performance tier) in front of magnetic disks or slower/cheaper SSDs 118 (e.g., in the capacity tier) to enhance the I/O performance. In certain other embodiments, both performance and capacity tiers may leverage the same type of storage (e.g., SSDs) for storing the data and performing the read/write operations. Additionally, it should be noted that SSDs 117 may include different types of SSDs that may be used in different layers (tiers) in some embodiments. For example, in some embodiments, the data in the performance tier may be written on a single-level cell (SLC) type of SSD, while the capacity tier may use a quad-level cell (QLC) type of SSD for storing the data.

As further discussed below, each node 111 may include a storage management module (referred to herein as a "VSAN module") in order to automate storage management workflows (e.g., create objects in the object store, etc.) and provide access to objects in the object store (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (IOPS), etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding VSAN module 114, may provide access to storage resources located in hardware 119 (e.g., SSDs 117 and magnetic disks 118) for use as storage for storage objects, such as virtual disks (or portions thereof) and other related files that may be accessed by any VM 112 residing in any of nodes 111 in cluster 110.

In one embodiment, VSAN module 114 may be implemented as a "VSAN" device driver within hypervisor 113. In such an embodiment, VSAN module 114 may provide access to a conceptual "VSAN" 115 through which an administrator can create a number of top-level "device" or namespace objects that are backed by object store 116. For example, during creation of a device object, the administrator may specify a particular file system for the device object (such device objects may also be referred to as "file system objects" hereinafter) such that, during a boot process, each hypervisor 113 in each node 111 may discover a /vsan/root node for a conceptual global namespace that is exposed by VSAN module 114. By accessing APIs exposed by VSAN module 114, hypervisor 113 may then determine all the top-level file system objects (or other types of top-level device objects) currently residing in VSAN 115.

When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system, such as a distributed (or clustered) virtual machine file system (VMFS) provided by VMware Inc. VMFS is designed to provide concurrency control among simultaneously accessing VMs. Because VSAN 115 supports multiple file system objects, it is able to provide storage resources through object store 116 without being confined by limitations of any particular clustered file system. For example, many clustered file systems may only scale to support a certain amount of nodes 111. By providing multiple top-level file system object support, VSAN 115 may overcome the scalability limitations of such clustered file systems.

As described in further detail in the context of FIG. 2 below, a file system object may, itself, provide access to a number of virtual disk descriptor files accessible by VMs 112 running in cluster 110. These virtual disk descriptor files may contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module, in embodiments as further described below) may communicate with other VSAN modules 114 of other nodes 111 to create and maintain an in-memory metadata database (e.g., maintained separately but in synchronized fashion in the memory of each node 111) that may contain metadata describing the locations, configurations, policies and relationships among the various objects stored in object store 116.

This in-memory metadata database is utilized by a VSAN module 114 on a node 111, for example, when a user (e.g., an administrator) first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in some embodiments as further described below) may traverse a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site may be performed through a network, such as a wide area network ("WAN").

Figure 2:
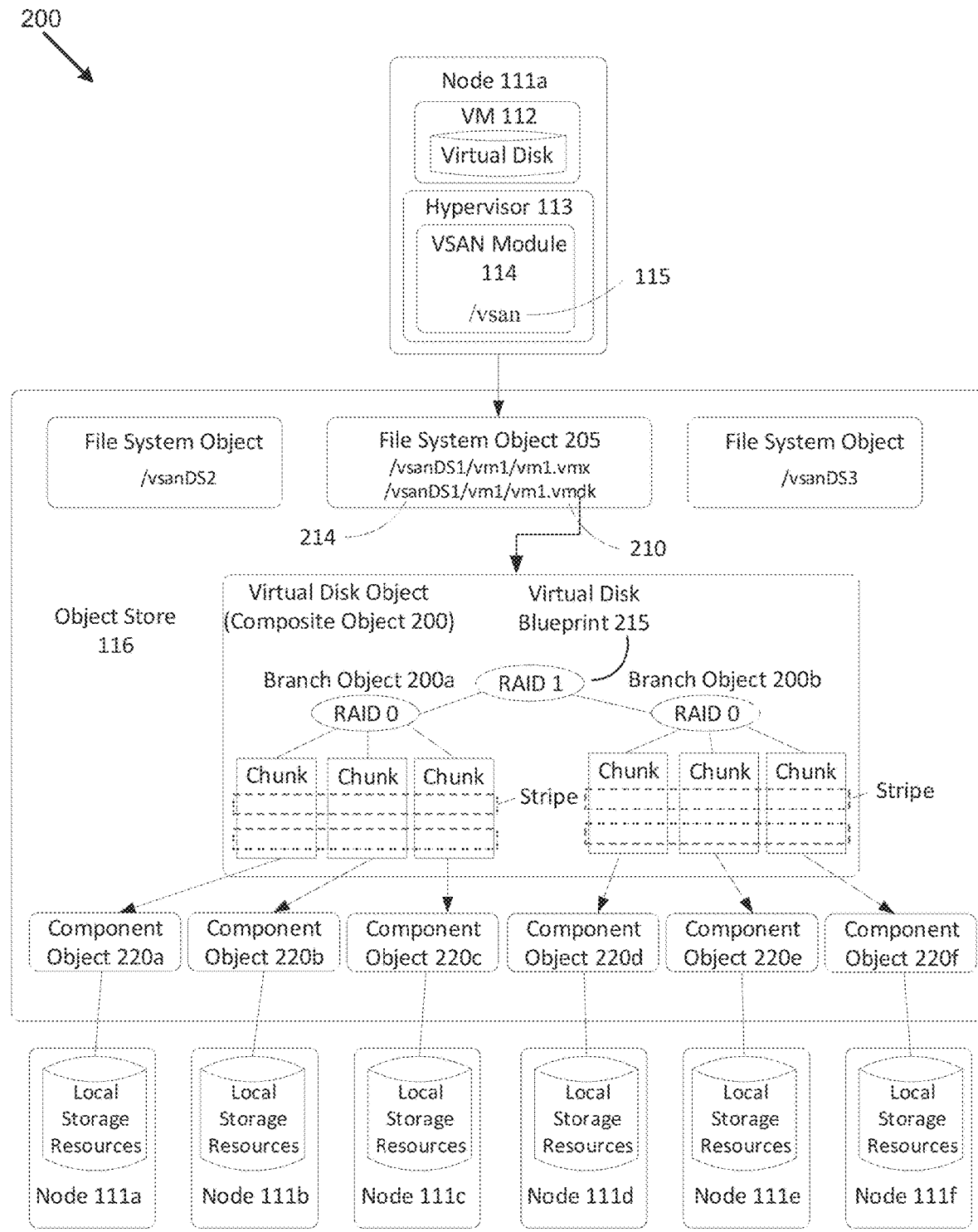
FIG. 2 is a diagram illustrating an example hierarchical structure of objects organized within an object store that represent a virtual disk, according to an example embodiment of the present application.

FIG. 2 is a diagram 200 illustrating an example hierarchical structure of objects organized within an object store 116 that represent a virtual disk, according to an example embodiment of the present application. As previously discussed above, a VM 112 running on one of nodes 111 may perform I/O operations on a virtual disk that is stored as a hierarchical composite object 200 in object store 116. Hypervisor 113 may provide VM 112 access to the virtual disk by interfacing with the abstraction of VSAN 115 through VSAN module 114 (e.g., by auto-mounting the top-level file system object 214 corresponding to the virtual disk object 200). For example, VSAN module 114, by querying its local copy of the in-memory metadata database, may be able to identify a particular file system object 205 (e.g., a VMFS file system object in one embodiment, etc.) stored in VSAN 115 that may store a descriptor file 210 for the virtual disk.

Descriptor file 210 may include a reference to composite object 200 that is separately stored in object store 116 and conceptually represents the virtual disk (and thus may also be sometimes referenced herein as a virtual disk object). Composite object 200 may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

Figure 4:
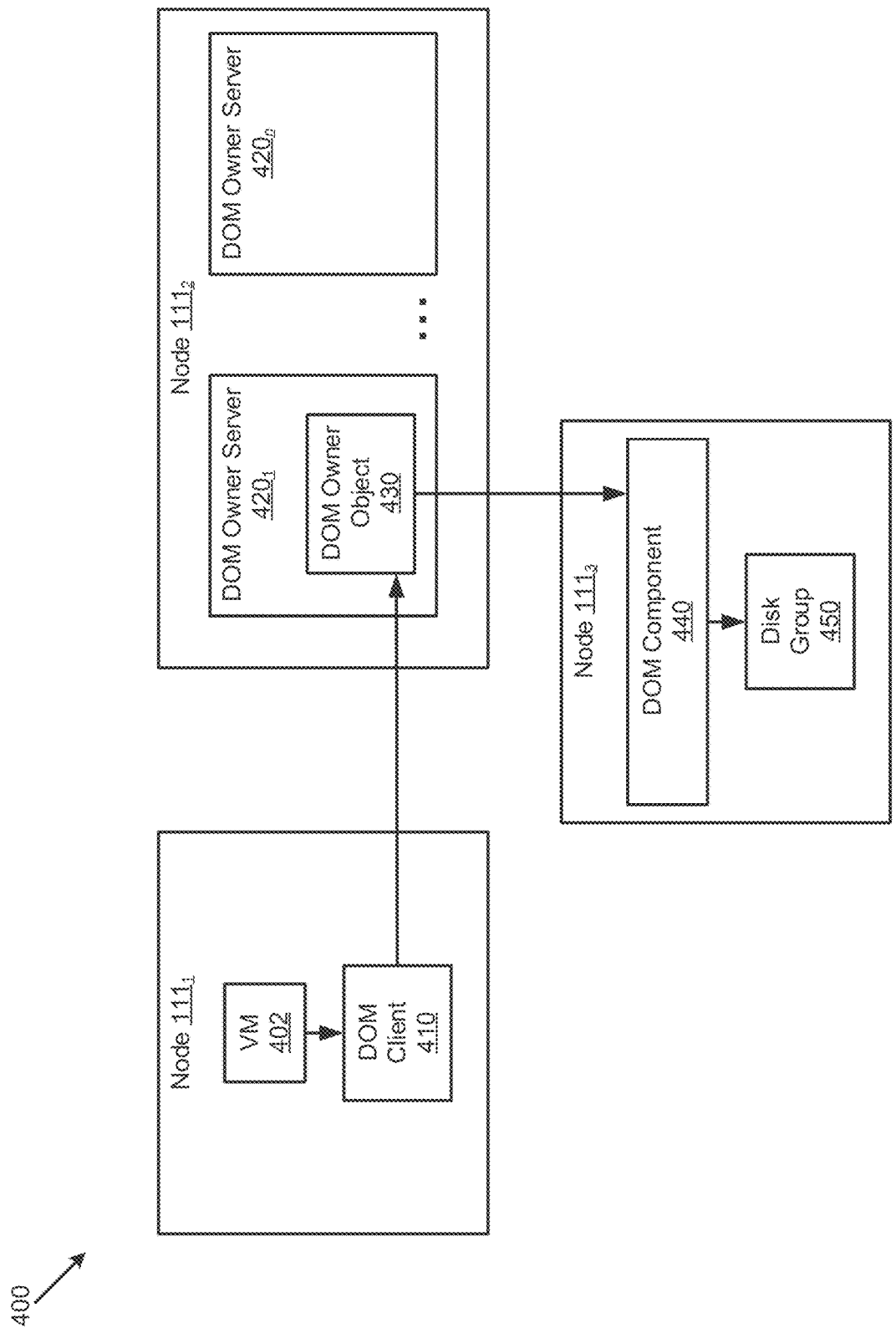
FIG. 4 is a diagram illustrating an example related to I/O operations handled by a DOM owner server.

Depending on the desired level of fault tolerance or performance efficiency, a virtual disk blueprint 215 may direct data corresponding to composite object 200 to be stored in the datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe may contain a plurality of data blocks (e.g., DB1, DB2, DB3 in stripe 1 of composite object 400, as shown in FIG. 4). In some cases, each stripe may also include one or more code blocks (e.g., RAID 5 or RAID 6). As shown, the stripes are then split vertically into different groups of blocks, referred to as chunks, where each chunk is logically represented as a "leaf" or "component" object to which composite object 200 contains a reference.

A stripe, in some embodiments, may also refer to several data and code blocks situated on different rows (which may also be called stripes in some embodiments) and columns (which may also be called chunks), where each column is associated with a physical disk of a host machine.

The metadata accessible by VSAN module 114 in the in-memory metadata database for each component object 220 provides a mapping to or otherwise identifies a particular node 111 in cluster 110 that houses the physical storage resources (e.g., magnetic disks or slower/cheaper SSD 118, etc.) that actually store the chunk (as well as the location of the chunk within such physical resource).

Figure 3:
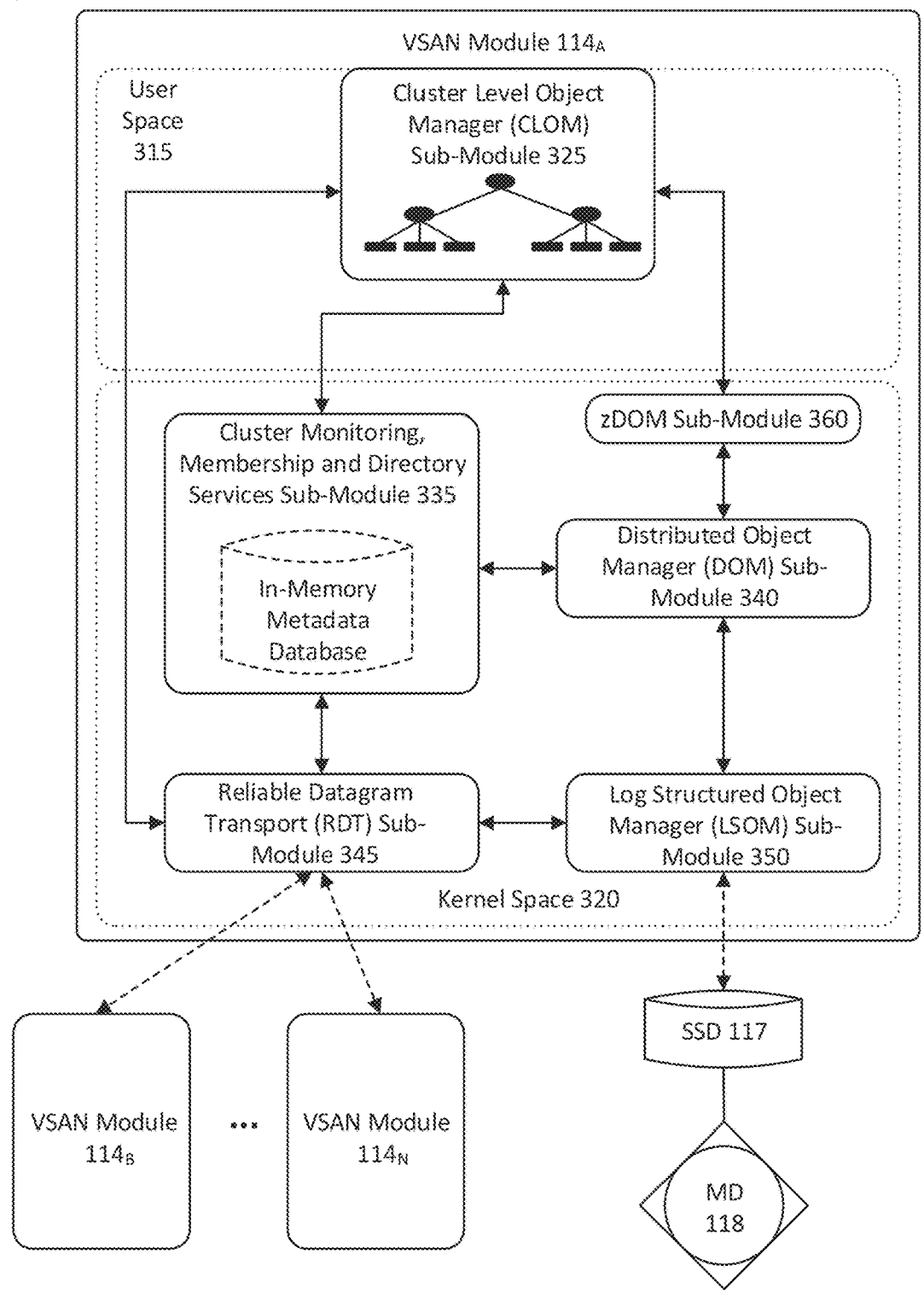
FIG. 3 is a diagram illustrating different components of a VSAN module, according to an example embodiment of the present application.

FIG. 3 is a diagram 300 illustrating different components of a VSAN module, according to an example embodiment of the present application. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object manager (CLOM) sub-module 325 that operates in user space 315. CLOM sub-module 325 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by a user to the storage profile or policy relating to an object or when changes to the cluster or workload result in an object being out of compliance with a current storage profile or policy.

In one embodiment, if a user creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, may be responsible for generating blueprint 215 describing the RAID 1/RAID 0 configuration for virtual disk object 200 in FIG. 2 when the virtual disk was first created by the user. As previously discussed, a storage policy may specify requirements for capacity, IOPS, availability, and reliability. Storage policies may also specify a workload characterization (e.g., random or sequential access, I/O request size, cache size, expected cache hit ration, etc.).

Additionally, the user may also specify an affinity to VSAN module 114 to preferentially use certain nodes 111 (or the local disks housed therein). For example, when provisioning a new virtual disk for a VM, a user may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 may consult the in-memory metadata database maintained by its VSAN module 114 to determine the current state of cluster 110 in order to generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340, for example, through zDOM sub-module 360. The DOM sub-module 340 may interact with object store 116 to implement the blueprint by, for example, allocating or otherwise mapping component objects (e.g., chunks) of the composite object to physical storage locations within various nodes 111 of cluster 110.

In some embodiments, zDOM sub-module 360 may instruct the DOM module 340 to preliminarily store the data received from the higher layers (e.g., from a VM) in a separate data log on persistent media and a physical memory (e.g., a bank). Once the size of the stored data in the bank reaches a threshold size (e.g., the stripe size), zDOM sub-module 360 may instruct the DOM module to flush the data stored in the bank onto one or more disks (e.g., of one or more host machines). zDOM sub-module 360 may do this full stripe writing to minimize the write amplification effect. In some embodiments, as described below, zDOM sub-module 360 may also perform data compression, as well as other datastore operations, such as hash calculation, data encryption, etc., to decrease the CPU cost and network and disk write bandwidth.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database may serve as a directory service that maintains a physical inventory of the VSAN environment, such as the various nodes 111, the storage resources in the nodes 111 (SSD, NVMe drives, magnetic disks, etc.) housed therein and the characteristics/capabilities thereof, the current state of the nodes 111 and their corresponding storage resources, network paths among the nodes 111, and the like.

As previously discussed, in addition to maintaining a physical inventory, the in-memory metadata database may further provide a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations.

For example, as previously discussed, during virtual disk creation, CLOM sub-module 325 may access the in-memory metadata database to generate a virtual disk blueprint, and in order to handle an I/O operation from a running VM 112, DOM sub-module 340 may access the in-memory metadata database to determine the nodes 111 that store the component objects (e.g., chunks) of a corresponding composite object (e.g., virtual disk object) and the paths by which those nodes are reachable in order to satisfy the I/O operation. In some embodiments, some or all of the metadata catalog (e.g., the mapping of the object to physical storage locations, etc.) may be stored with the virtual disk object 200 in the object store 116.

As previously discussed, DOM sub-module 340, during the handling of I/O operations, as well as during object creation, may control access to, and may handle operations on, those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component object (e.g., chunk, etc.) of the virtual disk object that is stored in the local storage of the second node 111 (or nodes) and which is the portion of the virtual disk that is subject to the I/O operation.

If the VM issuing the I/O operation resides on a node 111 that is also different from the coordinator of the virtual disk object, the DOM sub-module 340 of the node running the VM may also have to communicate across the network (e.g., LAN or WAN) with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 may also similarly communicate amongst one another during object creation (and/or modification). For example, a virtual disk blueprint generated by CLOM module 325 during creation of a virtual disk may include information that designate which nodes 111 should serve as the coordinators for the virtual disk object, as well as its corresponding component objects. The DOM sub-modules 340 for such designated nodes may be issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 may interact with a local storage object manager (LSOM) sub-module 350 that serves as the component in VSAN module 114 that may actually drive communication with the local SSDs and magnetic disks of its node 111. In addition to allocating local storage for component objects (as well as storing other metadata, such as policies and configurations for composite objects for which its node serves as coordinator, etc.), LSOM sub-module 350 may additionally monitor the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 may be used, for example, when DOM sub-modules 340 communicate with one another, as previously discussed above, to create objects or to handle I/O operations. In certain embodiments, RDT module 345 may interact with CMMDS module 335 to resolve the address of logical endpoints dynamically in order to maintain up-to-date location information in the in-memory metadata database, as well as to create, remove, or reestablish connections based on link health status. For example, if CMMDS module 335 reports a link as unhealthy, RDT sub-module 345 may drop the connection in favor of a link in better condition.

FIG. 4 is a diagram 400 illustrating an example related to I/O operations handled by a DOM owner server. Diagram 400 includes nodes $111_{1-3}$, which represent examples of nodes 111 of FIG. 1. Node $111_1$ comprises a VM 402, which is an example of a VM 112 of FIG. 1, and a DOM client 410, which may correspond to an instance of DOM sub-module 340 of FIG. 3. For example, DOM client 410 is referred to as a "client" in the context of its interactions with DOM owner object 430, which is the DOM owner or coordinator of an object to which DOM client 410 is directing a request to perform an I/O operation.

Node $111_2$ comprises a DOM owner object 430, which may correspond to another instance of DOM sub-module 340 of FIG. 3. For example, DOM owner object 410 is referred to as an "owner" due to it being the DOM owner or coordinator of an object that comprises at least one component that is stored in disk group 450 of node $111_3$. DOM owner object 430 coordinates access to the object and implements object configuration and reconfiguration. Each object has at most one active owner at any given point in time. In some embodiments, DOM owner object 410 comprises a DOM tree that represents the object owned by DOM owner object 410. The object may have components located on a plurality of hosts, but DOM owner object 430 is the owner of the entire object. Each DOM owner object, such as DOM owner object 430 is bound to one DOM owner server, such as DOM owner server $420_1$. A plurality of DOM owner servers $420_{1-n}$ run on node $111_2$, and each DOM owner server 420 is a software construct that is assigned processing resources of node $111_1$ such that DOM owner servers 420 function as processor threads. Thus, DOM owner object 430 is able to utilize the processing resources assigned to DOM owner server $430_1$ for performing processing tasks such as handling I/O operations with respect to the object of which it is the owner.

Node $111_3$ comprises DOM component 440, which may correspond to an instance of DOM sub-module 340 of FIG. 3. DOM component 440 provides an interface to object data that is stored in disk group 450 on node $111_3$.

In an example, VM 402 may issue an I/O request with respect to a particular object that is owned by DOM owner object 430. DOM client 410 on node $111_1$ receives the I/O request from VM 402 and determines based on local metadata (e.g., the in-memory metadata database of a VSAN module 114 of FIG. 3) that DOM owner object 430 on node $111_2$ is the owner of the object. Thus, DOM client 410 directs the I/O request to DOM owner object 430 running on DOM owner server $420_1$ on node $111_2$. DOM owner object 420 handles the I/O operation, which may involve communicating with DOM component 440 on node $111_3$ to access at least part of the object data that is stored in disk group 450 on node $111_3$. DOM owner object 430 may also or additionally access local object data on node $111_2$ and/or object data on one or more other nodes when processing the I/O request.

Multiple DOM owner objects may potentially be assigned to each DOM owner server 420, and the load on a given DOM owner server 420 may become high at certain times. Other DOM owner server 420 may have lighter loads, and may have unused processing resources. Accordingly, as described in more detail below with respect to FIG. 5, embodiments of the present disclosure involve dynamically migrating DOM owner objects between DOM owner servers 420 in an efficient manner to balance load and improve performance, such as by reducing latency.

Figure 5:
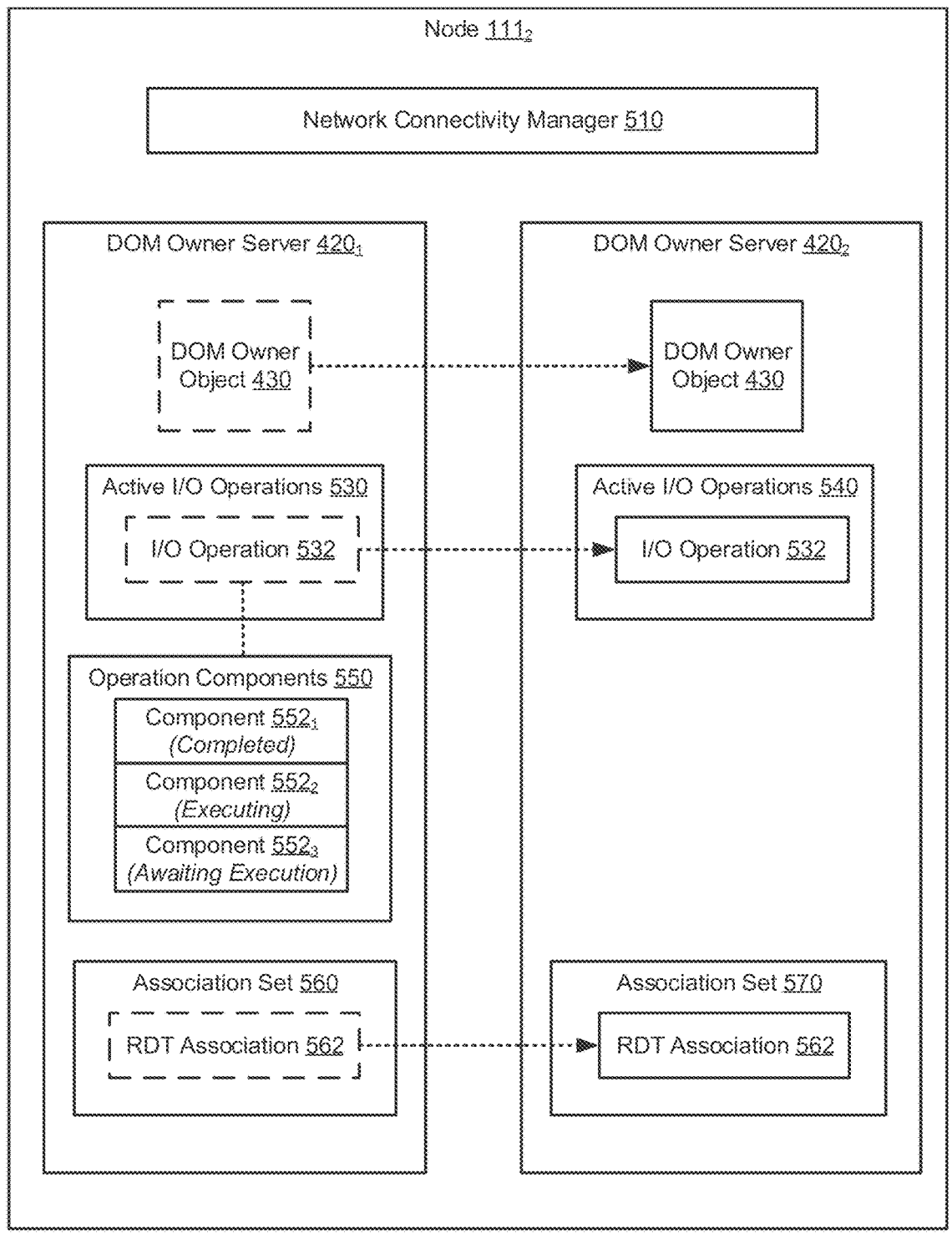
FIG. 5 is a diagram illustrating an example related to efficient migration of a DOM owner object between DOM owner servers.

FIG. 5 is a diagram illustrating an example related to efficient migration of a DOM owner object between DOM owner servers. FIG. 5 comprises node $111_2$, DOM owner servers $420_1$ and $420_2$, and DOM owner object 430 of FIG. 4.

In the depicted example, DOM owner object 430 is to be migrated from DOM owner server $420_1$ to DOM owner server $420_2$, such as based on a determination that DOM owner server $420_1$ has a heavy load (e.g., processor utilization above an upper threshold) and DOM owner server $420_2$ has a lighter load (e.g., processor utilization below a lower threshold).

While conventional techniques from DOM owner migration involve quiescing ongoing I/O operations, such as waiting for all ongoing I/O operations to complete before performing the migration, these techniques may be inefficient for dynamic migration due to delays and processing required to perform the migration. As such, embodiments of the present disclosure involve a lightweight migration that does not require waiting for ongoing I/O operations to complete before migrating. For example, if an I/O operation 532, included in a list of active I/O operations 530 on DOM owner server $420_1$, is ongoing at the time the migration process is initiated, techniques described herein allow DOM owner object 430 to be migrated without waiting for I/O operation 532 to complete.

I/O operation 532 comprises a plurality of operation components 550, including component $552_1$, which has already been executed, component $552_2$, which is currently executing, and component $552_3$, which is awaiting execution. For example, operation components 550 may correspond to processor cycles. In one example, each component is a callback that corresponds to a single processor cycle. Each of operation components 550 may potentially result in an incremental update to DOM owner object 430, and these incremental updates may be determined and stored as operation components 550 are executed. According to certain embodiments DOM owner object 430 is not updated based on I/O operation 532 until all operation components 550 of I/O operation 532 are complete and, once I/O operation 532 is complete, the stored incremental updates are used to update DOM owner object 430.

In an example embodiment, rather than waiting for the entirety of I/O operation 532 to complete before migration, certain techniques involve waiting only for the currently-executing component $552_2$ to complete its execution, storing any incremental update information that results from executing component $552_2$, and then migrating DOM owner object 430 along with I/O operation 532 (and any stored incremental update information associated with execution of components $552_1$ and $552_2$) from DOM owner server $420_1$ to DOM owner server $420_2$ before executing the subsequent component $552_3$. After migration, component $552_3$ is executed on DOM owner server $420_2$ to complete I/O operation 532, and then DOM owner object 430 is updated on DOM owner server $420_2$ based on incremental updates determined through execution of operation components 550. Thus, DOM owner object 430 is able to be migrated with minimal delay by not waiting for the entirety of I/O operation 532 to be completed before migration. The same process described with respect to I/O operation 532 may also be utilized for one or more additional ongoing I/O operations (not shown), resulting in additional performance improvements over conventional migration techniques.

DOM network connectivity manager 510 is separate from DOM owner servers 420, such as in a DOM "network layer," thus abstracting network connectivity away from DOM owner server 420. For example, DOM network connectivity manager 510 may maintain one or more RDT connections and one or more underlying transport control protocol (TCP) connections between DOM components on node $111_2$ (e.g., DOM owner object 430) and other endpoints, such as DOM components on nodes $111_1$ and $111_3$ of FIG. 4 (e.g., DOM clients and DOM owners). DOM network connectivity manager 510 may be an example implementation of a multiplexer with two inputs and one output (MUX2).

Because network connectivity is managed separately from DOM owner servers 420, DOM owner object 430 may be migrated between DOM owner servers $420_1$ and $420_2$ without the need to re-establish network connectivity between DOM owner object 430 and other DOM components. While network connectivity may be maintained throughout the migration, an RDT association 562 in an association set 560 of DOM owner server $420_1$ is migrated to a corresponding association set 570 on DOM owner server $420_2$. For example, RDT association 562 may be maintained at a leaf node of a tree that comprises information related to network connectivity, and so migration according to embodiments of the present disclosure may only involve moving RDT associations between leaf nodes without affecting associations at higher levels of the tree. In some embodiments, a DOM component notifies the network layer that a DOM owner object has been migrated from a source DOM owner server to a destination DOM owner server so that the network layer can ensure that traffic directed to the DOM owner object is sent to the destination DOM owner server.

Embodiments of the present disclosure avoid a significant amount of time and computing resources utilization required by conventional migration techniques. For example, techniques described herein avoid pre-cleanup operations performed on the source DOM owner server, which conventionally take several hundred of milliseconds and involve multiple sleep/wake cycles and waiting for all ongoing I/O operations to complete. Furthermore, techniques described herein avoid certain DOM owner setup operations on the destination DOM owner server, such as the creation of a change component policy (CCP), which is costly as it involves writing data to persistent data stores. By maintaining network connectivity separately from the DOM owner servers and by migrating ongoing I/O operations without waiting for them to complete, embodiments of the present disclosure avoid unnecessary sleep/wake cycles, avoid waiting for I/O operations to complete, avoid owner setup tasks such as creation of a CCP, and avoid freeing up a DOM tree (e.g., by transferring the DOM tree from the source index to the destination index as it is).

In some cases the migration operation is performed by one or more DOM components on the source side and the destination side. For example, some of the operations may be performed on the source side and other operations may be performed on the destination side. For example, a DOM orchestrator or arbitrator component running on the VSAN server may determine to migrate a DOM owner object from a source DOM owner server to a destination DOM owner server, and may orchestrate the migration by initiating various actions on the source side and the destination side. In one example, each given DOM owner server has an arbitrator component that periodically performs a check as to whether the given DOM owner server should be migrated (e.g., based on processor utilization) and, if so, performs operations to initiate/orchestrate a migration.

According to certain embodiments, migration involves a "SERVER_DETACH" command executed on the source DOM owner server (e.g., DOM owner server $420_1$) and a "SERVER_REATTACH" command executed on the destination DOM owner server (e.g., DOM owner server $420_2$) In some embodiments, prior to executing SERVER_DETACH, an initiation phase involves one or more basic checks such as checking whether the DOM owner object is eligible for migration (e.g., a DOM owner object undergoing abdication, which is the process by which a DOM owner object abandons ownership of an object, is not eligible for migration). Furthermore, one or more cluster monitoring, membership, and directory services (CMMDS) subscriptions of the DOM owner object and leaf objects may be removed on the source side.

SERVER_DETACH may involve removing RDT associations from the association set on the source side, such a removing RDT association 562 from association set 560, moving the object tree from the source DOM owner server to the destination DOM owner server, and removing all active operations from the active operations list on the source DOM server (e.g., active I/O operations 530). For example, the SERVER_DETACH actions may be performed in the context of a callback from a "thunk" object on the source DOM owner server. A thunk is a subroutine used to inject a calculation into another subroutine.

SERVER_REATTACH may involve the reverse of the SERVER_DETACH phase. For example, SERVER_REATTACH may involve attaching the transferred active operations to the active operations list on the destination DOM owner server (e.g., active I/O operations 540), storing the transferred object tree on the destination DOM owner server, and attaching the transferred RDT associations to the association set on the destination DOM owner server (e.g., association set 570), thereby causing the destination DOM owner server to start receiving any messages sent to the DOM owner object (e.g., including old messages), which guaranteed by RDT. For example, the SERVER_REATTACH actions may be performed in the context of a callback from a thunk object on the destination DOM owner server.

A CMMDS re-initiation operation may be performed by which the CMMDS subscriptions for all objects in the DOM tree are re-attached on the destination DOM owner server. The migration operation may then be complete.

In some embodiments, the DOM owner object is frozen during migration (which will only be a brief amount of time), such as by blocking all paths that create new operations on the DOM owner object. In some embodiments the DOM owner object will not be migrated is there are any ongoing control plane operations on the DOM owner object. CMMDS subscriptions of the DOM owner object are removed during migration, and no new CMMDS triggers will be allowed on the DOM owner object. RDT associations are removed from the association set on the source DOM owner server during migration, and no new I/O operations will occur on the DOM owner object during migration.

In certain embodiments, zDOM can work in parallel during the migration. For example, zDOM sub-module (described above with respect to FIG. 3) may communicate with the DOM owner object via callbacks. Callbacks are activated only after the DOM owner object migration is complete, and will be activated on the proper DOM owner server (e.g., the destination DOM owner server).

Disassociating the RDT association between the leaf and the component (e.g., using MUX2) allows the RDT association to only be removed on the leaf side without requiring any changes on the component side. Furthermore, the underlying TCP connection does not need to be removed, and is maintained throughout migration. Maintaining network connectivity throughout migration serves as a lock or reservation on the component, ensuring that no other owner in the cluster claims this component. If the RDT connection is lost, then cleanup and owner setup operations may need to be performed.

Figure 6:
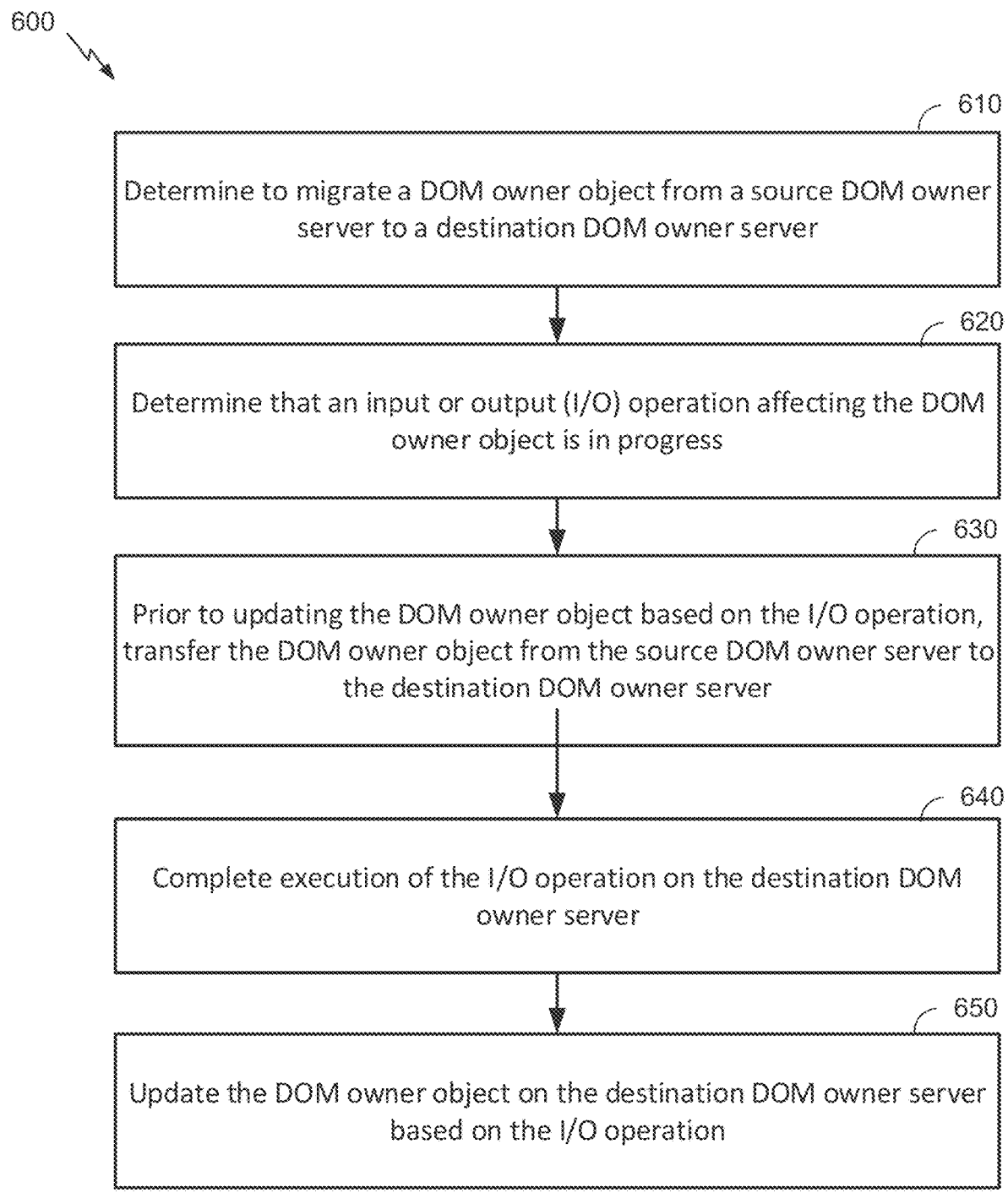
FIG. 6 is a flowchart illustrating a method (or process) for efficient DOM owner migration, according to an example embodiment of the present application.

FIG. 6 is a flowchart illustrating a method (or process) 600 for efficient DOM owner migration, according to an example embodiment of the present application. The method 600 may be performed by one or more components on one or more host computers, such as VSAN module 114, as described in FIG. 3 in some embodiments. In some other embodiments, the method may be performed by some other modules that reside in the hypervisor or outside of the hypervisor.

Method 600 may begin at step 610, with determining to migrate a DOM owner object from a source DOM owner server to a destination DOM owner server. For example, the DOM owner object may be migrated from a source DOM owner server with a processor utilization above an upper threshold to a destination DOM owner server with a processor utilization below a lower threshold.

Method 600 continues at step 620, with determining that an input or output (I/O) operation affecting the DOM owner object is in progress. It is noted that more than one I/O operation may be in progress, and all in-progress I/O operations may be handled in a similar manner.

Method 600 continues at step 630, with, prior to updating the DOM owner object based on the I/O operation, transferring the DOM owner object from the source DOM owner server to the destination DOM owner server. In some embodiments, the I/O operation comprises a plurality of components and the DOM owner object is transferred from the source DOM owner server to the destination DOM owner server after executing a given component of the plurality of components and prior to executing a subsequent component of the plurality of components. In an example, each component of the plurality of components corresponds to a respective processor cycle.

In certain embodiments, incremental updates with respect to the DOM owner object are stored during execution of the plurality of components, and wherein updating the DOM owner object on the destination DOM owner server based on the I/O operation is based on the incremental updates.

In some embodiments, transferring the DOM owner object from the source DOM owner server to the destination DOM owner server comprises transferring a DOM tree in its current state from the source DOM owner server to the destination DOM owner server. In an example, one or more network connections related to the DOM owner object are uninterrupted throughout the transferring of the DOM owner object from the source DOM owner server to the destination DOM owner server. For example, the one or more network connections may comprise a transport control protocol (TCP) connection that is managed by a component that is separate from the source DOM owner server and the destination DOM owner server.

In certain embodiments, transferring the DOM owner object from the source DOM owner server to the destination DOM owner server comprises: removing a reliable datagram transport (RDT) association related to the DOM owner object from an association set on the source DOM owner server; and removing the I/O operation from a list of active operations on the source DOM owner server.

In some embodiments, transferring the DOM owner object from the source DOM owner server to the destination DOM owner server comprises: adding the RDT association related to the DOM owner object to a corresponding association set on the destination DOM owner server; and adding the I/O operation to a corresponding list of active operations on the destination DOM owner server.

Method 600 continues at step 640, with completing execution of the I/O operation on the destination DOM owner server.

Method 600 continues at step 650, with updating the DOM owner object on the destination DOM owner server based on the I/O operation.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for efficient distributed object manager (DOM) owner migration in a virtual storage area network (VSAN), the method comprising:
    determining to migrate a DOM owner object from a source DOM owner server to a destination DOM owner server;
    determining that an input or output (I/O) operation affecting the DOM owner object is in progress;
    prior to updating the DOM owner object based on the I/O operation, transferring the DOM owner object from the source DOM owner server to the destination DOM owner server, wherein transferring the DOM owner object from the source DOM owner server to the destination DOM owner server comprises:
    removing a reliable datagram transport (RDT) association related to the DOM owner object from an association set on the source DOM owner server; and
    removing the I/O operation from a list of active operations on the source DOM owner server;
    completing execution of the I/O operation on the destination DOM owner server; and
    updating the DOM owner object on the destination DOM owner server based on the I/O operation.

2. The method of claim 1, wherein:
    the I/O operation comprises a plurality of components; and
    the DOM owner object is transferred from the source DOM owner server to the destination DOM owner server after executing a given component of the plurality of components and prior to executing a subsequent component of the plurality of components.

3. The method of claim 2, wherein each component of the plurality of components corresponds to a respective processor cycle.

4. The method of claim 2, wherein incremental updates with respect to the DOM owner object are stored during execution of the plurality of components, and wherein updating the DOM owner object on the destination DOM owner server based on the I/O operation is based on the incremental updates.

5. The method of claim 1, wherein transferring the DOM owner object from the source DOM owner server to the destination DOM owner server comprises transferring a DOM tree in its current state from the source DOM owner server to the destination DOM owner server.

6. The method of claim 1, wherein one or more network connections related to the DOM owner object are uninterrupted throughout the transferring of the DOM owner object from the source DOM owner server to the destination DOM owner server.

7. The method of claim 6, wherein the one or more network connections comprise a transport control protocol (TCP) connection that is managed by a component that is separate from the source DOM owner server and the destination DOM owner server.

8. The method of claim 1 wherein transferring the DOM owner object from the source DOM owner server to the destination DOM owner server comprises:
    adding the RDT association related to the DOM owner object to a corresponding association set on the destination DOM owner server; and
    adding the I/O operation to a corresponding list of active operations on the destination DOM owner server.

9. A system for efficient distributed object manager (DOM) owner migration in a virtual storage area network (VSAN), the system comprising:
    at least one memory; and
    at least one processor coupled to the at least one memory, the at least one processor and the at least one memory configured to:
    determine to migrate a DOM owner object from a source DOM owner server to a destination DOM owner server;
    determine that an input or output (I/O) operation affecting the DOM owner object is in progress;
    prior to updating the DOM owner object based on the I/O operation, transfer the DOM owner object from the source DOM owner server to the destination DOM owner server, wherein transferring the DOM owner object from the source DOM owner server to the destination DOM owner server comprises:
    removing a reliable datagram transport (RDT) association related to the DOM owner object from an association set on the source DOM owner server; and
    removing the I/O operation from a list of active operations on the source DOM owner server; and
    complete execution of the I/O operation on the destination DOM owner server;
    update the DOM owner object on the destination DOM owner server based on the I/O operation.

10. The system of claim 9, wherein:
    the I/O operation comprises a plurality of components; and
    the DOM owner object is transferred from the source DOM owner server to the destination DOM owner server after executing a given component of the plurality of components and prior to executing a subsequent component of the plurality of components.

11. The system of claim 10, wherein each component of the plurality of components corresponds to a respective processor cycle.

12. The system of claim 10, wherein incremental updates with respect to the DOM owner object are stored during execution of the plurality of components, and wherein updating the DOM owner object on the destination DOM owner server based on the I/O operation is based on the incremental updates.

13. The system of claim 9, wherein transferring the DOM owner object from the source DOM owner server to the destination DOM owner server comprises transferring a DOM tree in its current state from the source DOM owner server to the destination DOM owner server.

14. The system of claim 9, wherein one or more network connections related to the DOM owner object are uninterrupted throughout the transferring of the DOM owner object from the source DOM owner server to the destination DOM owner server.

15. The system of claim 14, wherein the one or more network connections comprise a transport control protocol (TCP) connection that is managed by a component that is separate from the source DOM owner server and the destination DOM owner server.

16. The system of claim 9, wherein transferring the DOM owner object from the source DOM owner server to the destination DOM owner server comprises:
   adding the RDT association related to the DOM owner object to a corresponding association set on the destination DOM owner server; and
   adding the I/O operation to a corresponding list of active operations on the destination DOM owner server.

17. A non-transitory computer-readable medium storing instructions that, when executed by one or more processors, cause the one or more processors to:
   determine to migrate a DOM owner object from a source DOM owner server to a destination DOM owner server;
   determine that an input or output (I/O) operation affecting the DOM owner object is in progress;
   prior to updating the DOM owner object based on the I/O operation, transfer the DOM owner object from the source DOM owner server to the destination DOM owner server, wherein transferring the DOM owner object from the source DOM owner server to the destination DOM owner server comprises: removing a reliable datagram transport (RDT) association related to the DOM owner object from an association set on the source DOM owner server; and removing the I/O operation from a list of active operations on the source DOM owner server;
   complete execution of the I/O operation on the destination DOM owner server; and
   update the DOM owner object on the destination DOM owner server based on the I/O operation.

18. The non-transitory computer-readable medium of claim 17, wherein:
   the I/O operation comprises a plurality of components; and
   the DOM owner object is transferred from the source DOM owner server to the destination DOM owner server after executing a given component of the plurality of components and prior to executing a subsequent component of the plurality of components.

19. The non-transitory computer-readable medium of claim 18, wherein each component of the plurality of components corresponds to a respective processor cycle.

20. The non-transitory computer-readable medium of claim 18, wherein incremental updates with respect to the DOM owner object are stored during execution of the plurality of components, and wherein updating the DOM owner object on the destination DOM owner server based on the I/O operation is based on the incremental updates.

* * * * *